(12) United States Patent
Haravu et al.

(10) Patent No.: US 10,986,091 B2
(45) Date of Patent: Apr. 20, 2021

(54) SYSTEMS AND METHODS OF SERVERLESS MANAGEMENT OF DATA MOBILITY DOMAINS

(71) Applicant: EMC IP Holding Company LLC, Hopkinton, MA (US)

(72) Inventors: Nagasimha Haravu, Apex, NC (US); Tianming Zhang, Hopkinton, MA (US); Sathish Janamanchi, Shrewsbury, MA (US); Michael Zeldich, Newton, MA (US); Daniel S. Keefe, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 192 days.

(21) Appl. No.: 15/797,691

(22) Filed: Oct. 30, 2017

(65) Prior Publication Data
US 2019/0132314 A1    May 2, 2019

(51) Int. Cl.
*G06F 21/00* (2013.01)
*H04L 29/06* (2006.01)
*H04L 29/08* (2006.01)

(52) U.S. Cl.
CPC ...... *H04L 63/0869* (2013.01); *H04L 63/0823* (2013.01); *H04L 63/104* (2013.01); *H04L 67/1097* (2013.01)

(58) Field of Classification Search
CPC ............. H04L 63/0869; H04L 67/1097; H04L 63/0823; H04L 63/104
See application file for complete search history.

(56) References Cited

U.S. PATENT DOCUMENTS

| | | | |
|---|---|---|---|
| 7,984,253 B1 | 7/2011 | Gladevet et al. | |
| 8,015,235 B1 | 9/2011 | Bauer et al. | |
| 8,631,114 B1 | 1/2014 | Bauer et al. | |
| 9,417,812 B1 | 8/2016 | Palekar et al. | |
| 9,456,011 B1 | 9/2016 | Nick et al. | |
| 9,774,586 B1 | 9/2017 | Roche et al. | |
| 2005/0193080 A1* | 9/2005 | Gold | G06F 15/167 709/208 |
| 2008/0222711 A1* | 9/2008 | Michaelis | H04W 12/06 726/7 |

(Continued)

*Primary Examiner* — Trong H Nguyen
*Assistant Examiner* — Michael M Lee
(74) *Attorney, Agent, or Firm* — BainwoodHuang

(57) ABSTRACT

Techniques for managing data mobility domains in storage system environments. The techniques employ a multiple master approach, in which each storage system in a storage system domain can function as an owner of the domain. Each domain owner has privileges pertaining to addition of new members to the domain, removal of members from the domain, and modification of domain credentials. When a new storage system is added as a member of the domain, the domain credentials are provided from the domain owner to the new storage system, resulting in the domain credentials being shared among all members of the domain. Domain membership information is also shared among all members of the domain. In this way, the management of storage system domains can be achieved without the need of a domain management server, avoiding a single point of failure or latency and reducing the complexity/cost associated with the domain management server.

21 Claims, 6 Drawing Sheets

(56) References Cited

U.S. PATENT DOCUMENTS

| | | | | |
|---|---|---|---|---|
| 2014/0310775 A1* | 10/2014 | Resch | .................. | G06F 3/0617 |
| | | | | 726/3 |
| 2016/0112407 A1* | 4/2016 | Nara | .................. | H04L 67/1095 |
| | | | | 726/5 |
| 2016/0330209 A1* | 11/2016 | Iacob | .................... | H04L 9/0891 |
| 2017/0316075 A1* | 11/2017 | Deshmukh | ............ | G06F 21/604 |
| 2018/0198765 A1* | 7/2018 | Maybee | .............. | G06F 16/9027 |

\* cited by examiner

SYSTEMS AND METHODS OF SERVERLESS MANAGEMENT OF DATA MOBILITY DOMAINS

BACKGROUND

In conventional storage system environments, data mobility operations such as data replication and/or migration among two or more data storage systems typically require secure communications connections to be established between the respective storage systems. In a peer-to-peer approach to establishing such secure communications connections, two storage systems are authenticated to one another through the exchange of credentials (e.g., a username, a password or certificate). Once authenticated, a secure communications connection is established between the peer storage systems, allowing the respective storage systems to communicate directly with one another over the secure connection. In an approach involving domain memberships, a data storage system participating in a domain typically communicates with a domain management server to determine whether another data storage system to which it desires to be authenticated is a member of the same domain. If it is determined that the other storage system is a member of the same domain, then the data storage system retrieves domain credentials (e.g., shared certificate) from the data management server for authentication with the other storage system. Once authenticated, a secure communications connection is established between the two domain member systems, allowing the respective storage systems to communicate directly with one another over the secure connection.

SUMMARY

The peer-to-peer approach to establishing secure communications connections in a storage system environment can be problematic, however, especially as the number of data storage systems in the storage system environment increases. For example, to assure a high level of security in such a storage system environment, the credentials (e.g., username, password or certificate) used for authentication of the respective storage systems are typically renewed on a regular basis. However, having to renew the credentials associated with each secure communications connection established between peer storage systems can place a significant burden on system administrators who may be called upon to manage the renewal of credentials associated with increasing numbers of such secure connections.

The burden of managing the renewal of credentials can be reduced in the approach involving domain memberships, as the number of secure connections can be reduced to that required for the data storage systems to communicate with the domain management server. However, the approach involving domain memberships can also be problematic in that it introduces a dependency upon the domain management server, which potentially adds a single point of failure or network latency. For example, if the domain management server experiences a hardware fault and/or software error, crashes, goes offline, or otherwise becomes inoperative, then the ability to authenticate within the storage system environment may at least temporarily be lost until the domain management server comes back online. To avoid such a situation, the domain management server can be configured as a high availability server in a cluster environment. However, employing such a high availability domain management server can add an inordinate amount of complexity and/or cost within the storage system environment.

Improved systems, methods, and techniques are disclosed herein for managing data mobility domains in storage system environments. The disclosed techniques can provide a foundation upon which cloud-based elastic storage systems may be built. The disclosed techniques employ a multiple master approach, in which each data storage system in a storage system domain can potentially function as a manager (also referred to herein as the "owner") of the storage system domain. Each owner of the storage system domain has privileges pertaining to (i) the addition of new members to the storage system domain, (ii) the removal of members from the storage system domain, and (iii) the modification of domain credentials (e.g., shared certificate). When a new storage system is to be added as a member of the storage system domain, the owner of the storage system domain and the new storage system are authenticated to one another through the exchange of local credentials. Once authenticated, the domain definition (e.g., domain name, shared certificate) is copied, pushed, or otherwise provided from the owner of the storage system domain to the new storage system, resulting in the domain definition ultimately being distributed and/or shared among all of the members added to the storage system domain. Domain membership information (e.g., member identifiers) is also shared among all of the members of the storage system domain, using the domain credentials for authentication. By providing the domain definition to all members added to a storage system domain, sharing domain membership information among all of the domain members, and allowing potentially all of the domain members to function as owners of the storage system domain, the management of storage system domains can be achieved without the need of a domain management server, thereby avoiding a single point of failure or network latency, as well as reducing the complexity and/or cost associated with the use of such a domain management server.

In certain embodiments, a method of serverless management of data mobility domains in a network includes receiving a domain definition of a data mobility domain at a first storage system in the network to establish the first storage system as a first member among a plurality of members of the data mobility domain. The domain definition includes a domain name and domain credentials. The method further includes authenticating the first storage system and a second storage system in the network to one another to establish a first secure connection between the first storage system and the second storage system. The first storage system is designated as an owner of the data mobility domain, and stores domain membership information pertaining to each member of the data mobility domain. The method still further includes, having authenticated the first storage system and the second storage system to one another, copying, over the first secure connection, the domain definition from the first storage system to the second storage system to establish the second storage system as a second member among the plurality of members of the data mobility domain. The method yet further includes, in response to a change in one or more of the domain credentials and the domain membership information, automatically propagating the change over the network among the plurality of members of the data mobility domain using the domain credentials.

In certain further embodiments, a system for serverless management of data mobility domains over a network includes a plurality of data storage systems, including at least a first storage system and a second storage system. Each of the plurality of data storage systems is coupled to the network. The first storage system is operative to receive a domain definition of a data mobility domain to establish the first storage system as a first member among a plurality of members of the data mobility domain. The domain definition includes a domain name and domain credentials. The first storage system is further operative to authenticate itself to the second storage system to establish a first secure connection between the first storage system and the second storage system. The first storage system is designated as an owner of the data mobility domain. The first storage system is operative to store domain membership information pertaining to each member of the data mobility domain. Having authenticated itself to the second storage system, the first storage system is operative to copy, over the first secure connection, the domain definition to the second storage system to establish the second storage system as a second member among the plurality of members of the data mobility domain. In response to a change in one or more of the domain credentials and the domain membership information, the first storage system is operative to automatically propagate the change over the network among the plurality of members of the data mobility domain using the domain credentials.

Other features, functions, and aspects of the invention will be evident from the Detailed Description that follows.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 1b is a block diagram of the system administrator computer of FIG. 1a;

FIG. 1c is a block diagram of a respective one of the plurality of data storage systems of FIG. 1a;

DETAILED DESCRIPTION

Improved systems, methods, and techniques are disclosed herein for managing data mobility domains in storage system environments. The disclosed techniques employ a multiple master approach, in which each data storage system in a storage system domain can function as an owner of the domain. Each domain owner has privileges pertaining to the addition of new members to the domain, the removal of members from the domain, and the modification of domain credentials (e.g., shared certificate). When a new storage system is added as a member of the storage system domain, the domain definition (e.g., domain name, shared certificate) are provided from the domain owner to the new storage system, resulting in the domain definition ultimately being distributed and/or shared among all members added to the domain. Domain membership information is also shared among all members of the domain. In this way, the management of storage system domains can be achieved without the need of a domain management server, thereby avoiding a single point of failure or network latency, as well as reducing the complexity and/or cost associated with the use of such a domain management server.

Figure 1A:
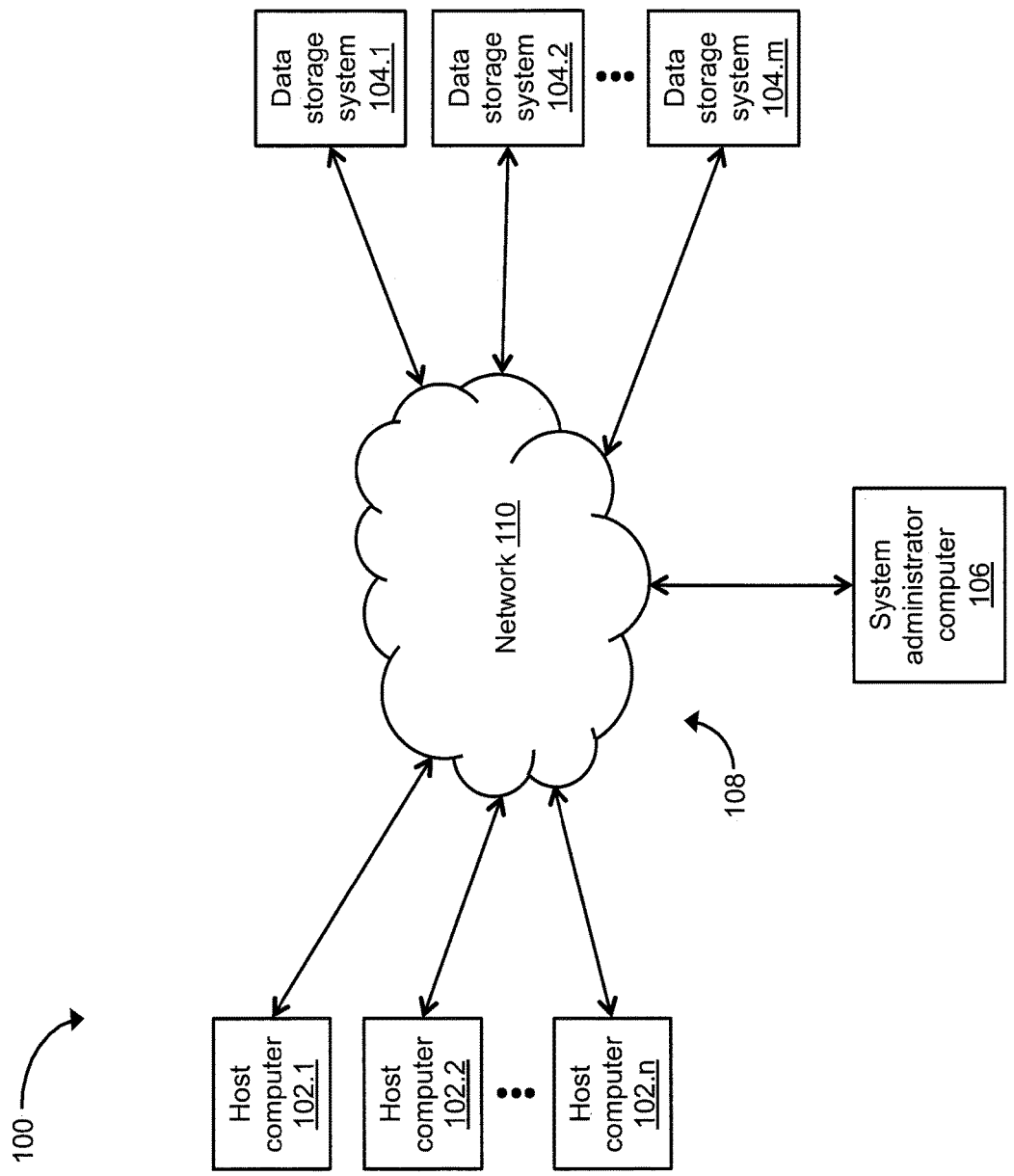
FIG. 1a is a block diagram of an exemplary storage system environment for managing data mobility domains, including a plurality of host computers, a plurality of data storage systems, and a system administrator computer coupled to a network.

FIG. 1a depicts an illustrative embodiment of an exemplary storage system environment 100 for serverless management of data mobility domains. As shown in FIG. 1a, the storage system environment 100 can include a plurality of host computers 102.1, 102.2, . . . , 102.n, a plurality of data storage systems 104.1, 104.2, . . . , 104.m, and a system administrator computer 106 communicably coupled to a communications medium 108, which includes at least one network 110. For example, each of the plurality of host computers 102.1, 102.2, . . . , 102.n can be configured as a web server computer, a file server computer, an email server computer, an enterprise server computer, and/or any other suitable computer or computerized device. Further, each of the plurality of data storage systems 104.1, 104.2, . . . , 104.m can be a member of one or more storage system domains defined and/or configured using the system administrator computer 106, which can be remote from (such as in a data center) or local to one or more of the data storage systems 104.1, 104.2, . . . , 104.m. The plurality of host computers 102.1, 102.2, . . . , 102.n can provide input/output (I/O) requests (e.g., small computer system interface (SCSI) commands) to one or more of the plurality of data storage systems 104.1, 104.2, . . . , 104.m over the network 110. Such I/O requests can direct the respective storage systems 104.1, 104.2, . . . , 104.m to store and/or retrieve data blocks from logical storage units (LUNs) and/or virtual volumes (VVOLs) on behalf of the respective host computers 102.1, 102.2, . . . , 102.n.

The communications medium 108 including the network 110 can be configured to interconnect the plurality of host computers 102.1, 102.2, . . . , 102.n, the plurality of data storage systems 104.1, 104.2, . . . , 104.m, and/or the system administrator computer 106 to enable the respective host computers, data storage systems, and/or system administrator computer to communicate and exchange signaling. As shown in FIG. 1a, at least a portion of the communications medium 108 is illustrated as a "cloud" to indicate that the communications medium 108 can have a variety of different topologies, including, but not limited to, a backbone topology, a hub-and-spoke topology, a loop topology, an irregular topology, or any suitable combination thereof. The communications medium 108 can also include, but is not limited to, copper-based data communications devices and cabling, fiber optic-based devices and cabling, wireless devices, or any suitable combination thereof. In addition, the communications medium 108 can be configured to support storage area network (SAN)-based communications, local area network (LAN)-based communications, cellular communications, wide area network (WAN)-based communications, distributed infrastructure communications, and so on, or any suitable combination thereof.

Figure 1C:
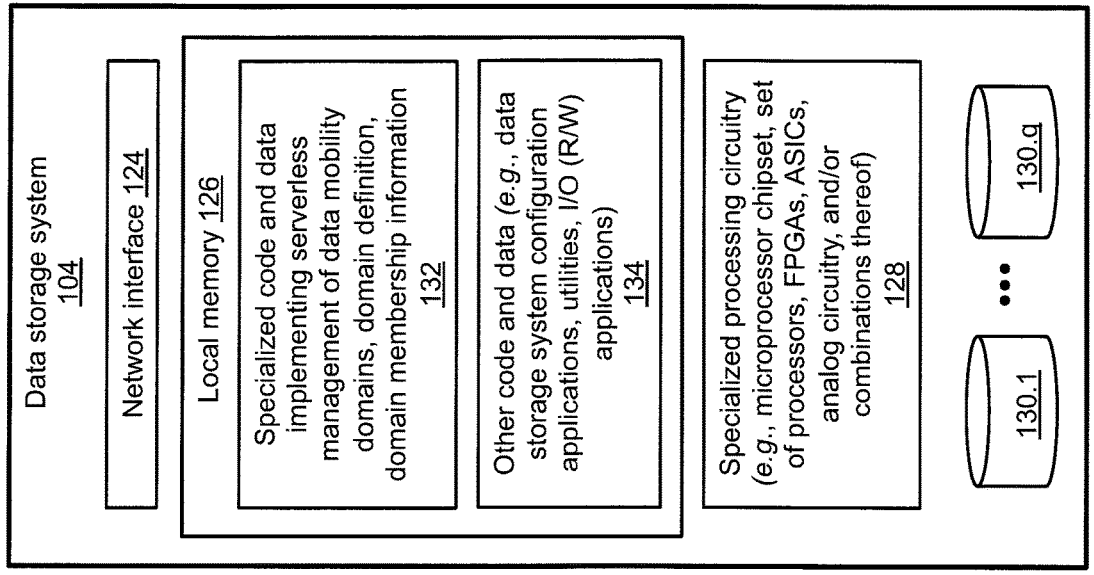
Figure 1B:
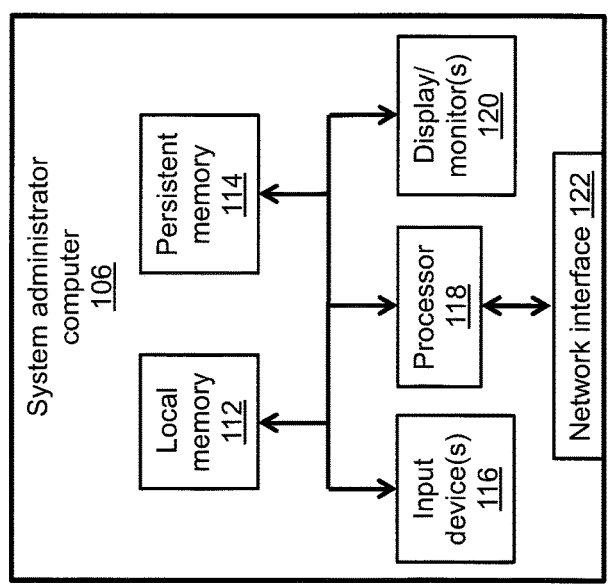

FIG. 1b depicts an illustrative embodiment of the system administrator computer 106 of FIG. 1a. As shown in FIG. 1b, the system administrator computer 106 can include at least one processor 118, a local memory 112, a persistent memory 114, an input device 116 (e.g., a keyboard, mouse, touchpad, touchscreen), a display, monitor, or console 120, and a network interface 122. Within the storage system environment 100 of FIG. 1a, the system administrator computer 106 can execute at least one program out of the local memory 112 to enable a system administrator to define and/or configure the storage system domains of the respective storage systems 104.1, 104.2, . . . , 104.*m*.

FIG. 1*c* depicts an illustrative embodiment of an exemplary data storage system 104 among the plurality of data storage systems 104.1, 104.2, . . . , 104.*m* of FIG. 1*a*. It is noted that each of the plurality of data storage systems 104.1, 104.2, . . . , 104.*m* can be configured like the data storage system 104 of FIG. 1*c*. As shown in FIG. 1*c*, the data storage system 104 can include a network interface 124, a local memory 126, specialized processing circuitry 128, and one or more data storage devices 130.1, . . . , 130.*q*. The network interface 124 can be configured to connect the data storage system 104 as a node on the network 110 (see FIG. 1*a*), enabling access to/from the system administrator computer 106 and/or the respective host computers 102.1, 102.2, . . . , 102.*n*, as appropriate. Such access over the network 110 can be SAN-based, Internet protocol (IP)-based, cellular-based, cable-based, fiber optic-based, cloud-based, wireless, and so on, or any suitable combination thereof.

The local memory 126 (see FIG. 1*c*) within the data storage system 104 can be configured to include volatile storage (e.g., dynamic random access memory (DRAM), static random access memory (SRAM)), as well as non-volatile storage (e.g., magnetic memory, flash memory). As shown in FIG. 1*c*, the local memory 126 can be configured to store a variety of software constructs, including specialized code and data 132 and other code and data 134. The specialized code and data 132 can include one or more sets of instructions that direct the specialized processing circuitry 128 to implement the systems, methods, and techniques for serverless management of data mobility domains, as described herein, as well as domain definition and domain membership information. The other code and data 134 can include one or more sets of instructions that direct the specialized processing circuitry 128 to perform input/output (I/O) (e.g., read and/or write (R/W)) operations involving the respective storage devices 130.1, . . . , 130.*q*, as well as various other operations involving, for example, administrative tools, utilities, other user-level applications, and so on. The specialized processing circuitry 128 (see FIG. 1*c*) is configured to operate in accordance with the specialized code and data 132 and/or the other code and data 134 stored in the local memory 126. It is noted that the specialized processing circuitry 128 can be implemented in a variety of ways, using one or more processors (or cores) running specialized software, one or more application specific integrated circuits (ASICs), one or more field programmable gate arrays (FPGAs), one or more discrete components, digital circuits, analog circuits, and so on, or any suitable combination thereof.

In the context of the specialized processing circuitry 128 being implemented using one or more processors running specialized software, a computer program product can be configured to deliver all or a portion(s) of the specialized code and data 132 and other code and data 134 to the specialized processing circuitry 128. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by one or more of the processors, perform the methods described herein. Such media may be considered to be articles of manufacture, and may be transportable from one data storage system to another data storage system.

The data storage devices 130.1, . . . , 130.*q* (see FIG. 1*c*) within the data storage system 104 can include one or more of volatile memory, non-volatile memory, hard disk drives (HDDs), solid state drives (SSDs), tape drives, optical drives, network attached storage (NAS) devices, SAN devices, and so on. Each data storage device 130.1, . . . , 130.*q* can be locally attached to an I/O channel of a respective storage system while also being accessible over the network 110. Further, each data storage device 130.1, . . . , 130.*q* can be a single stand-alone component, or a system of data storage devices such as a collection of drives (e.g., a redundant array of inexpensive disks (RAID) group) logically operating together as a unified storage device to provide a desired level of data protection through redundancy. Such a RAID group can be configured to store large quantities of data for access by one or more processors operative to handle requests for allocation, as well as host I/O requests.

The systems, methods, and techniques disclosed herein for serverless management of data mobility domains in storage system environments can provide a foundation upon which cloud-based elastic storage systems may be built. The disclosed techniques can employ a multiple master approach, in which each data storage system 104.1, 104.2, . . . , 104.*m* in a cluster can potentially function as a manager (also referred to herein as the "owner") of a storage system domain. Each owner of the storage system domain can have privileges pertaining to (i) the addition of new members to the storage system domain, (ii) the removal of members from the storage system domain, and (iii) the modification of domain credentials (e.g., shared certificate). When a new storage system is to be added as a member of the storage system domain, the owner of the storage system domain and the new storage system can be authenticated to one another through the exchange of local credentials. Once authenticated, the domain definition (e.g., domain name, shared certificate) can be copied, pushed, or otherwise provided from the owner of the storage system domain to the new storage system, resulting in the domain definition ultimately being distributed and/or shared among all of the members added to the storage system domain. Further, using the domain credentials for authentication, domain membership information (e.g., member identifiers) can be shared among all of the members of the storage system domain, and domain data replication and/or migration among two or more of the domain members can be performed in a push (or pull) fashion. By providing the domain definition to all members added to a storage system domain, sharing domain membership information among all of the domain members, and allowing potentially all of the domain members to function as owners of the storage system domain, the management of storage system domains can be achieved without the need of a domain management server, thereby avoiding a single point of failure or network latency, as well as reducing the complexity and/or cost associated with the use of such a domain management server.

Figure 2:
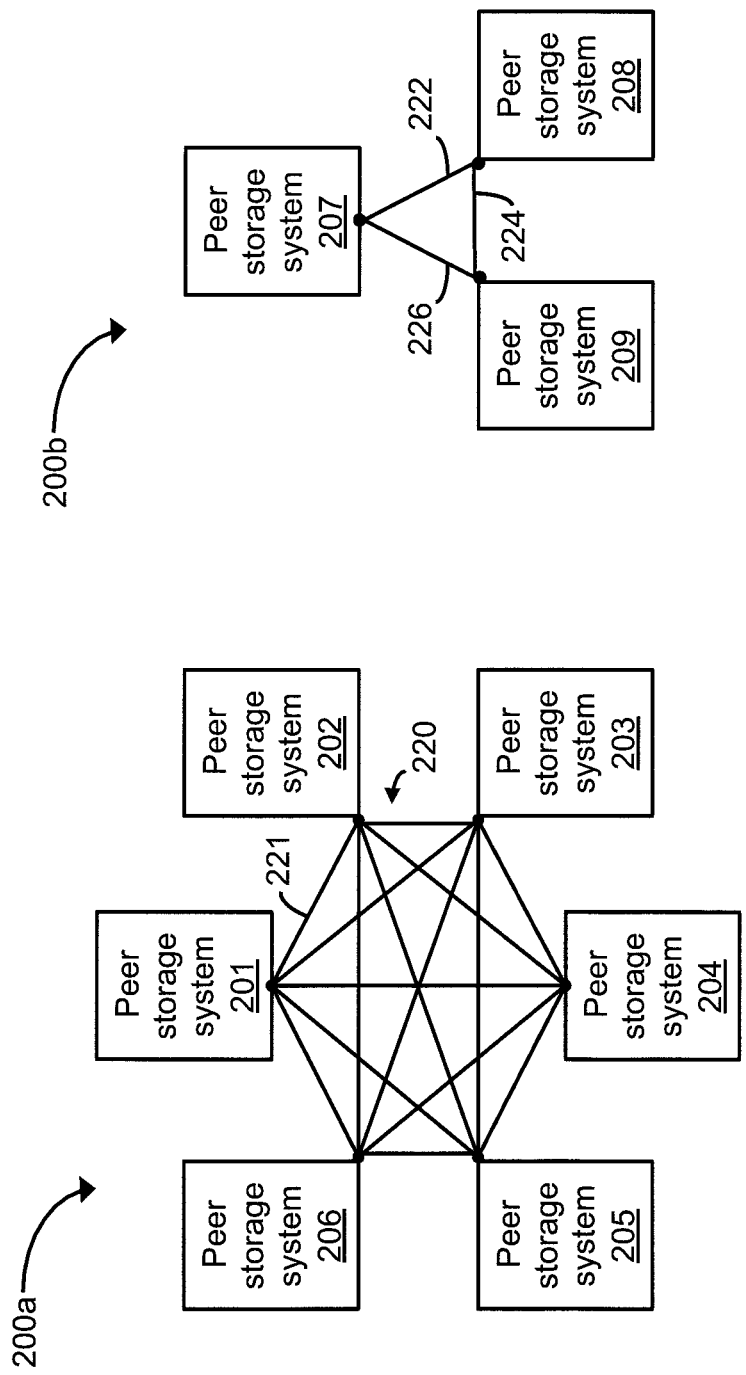
FIG. 2 is a block diagram of two groups of interconnected peer storage systems.
Figure 3:
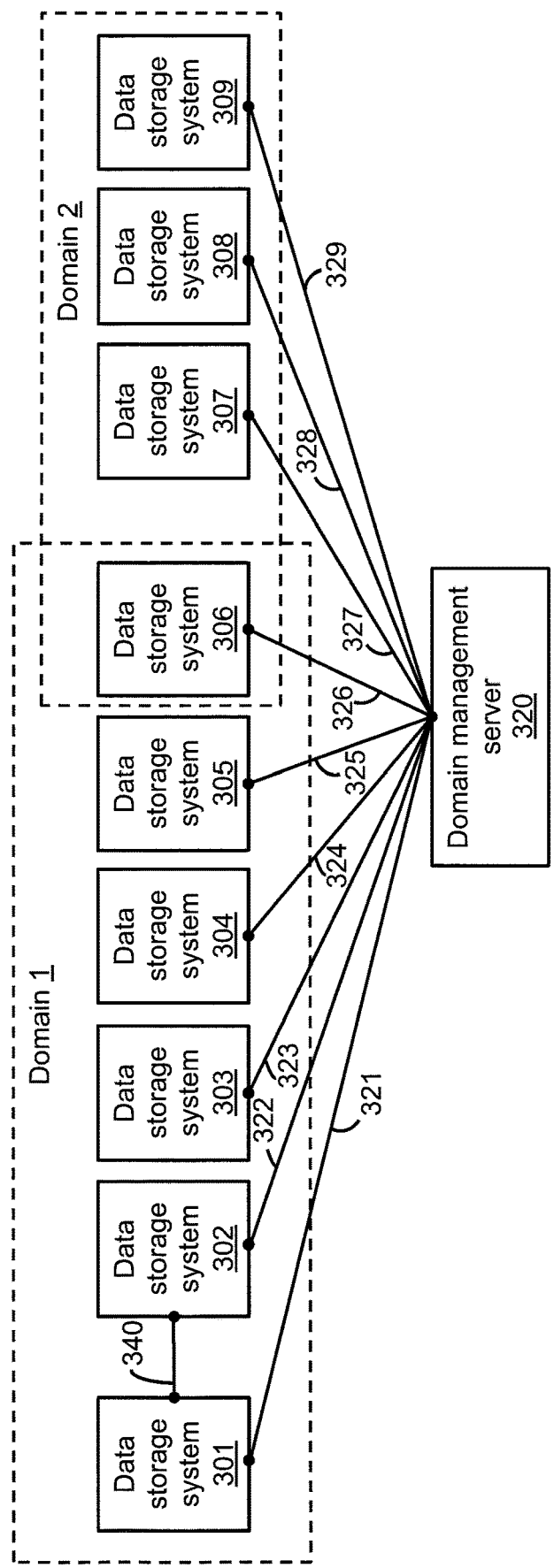
FIG. 3 is a block diagram of two storage system domains managed by a domain management server.
Figure 4:
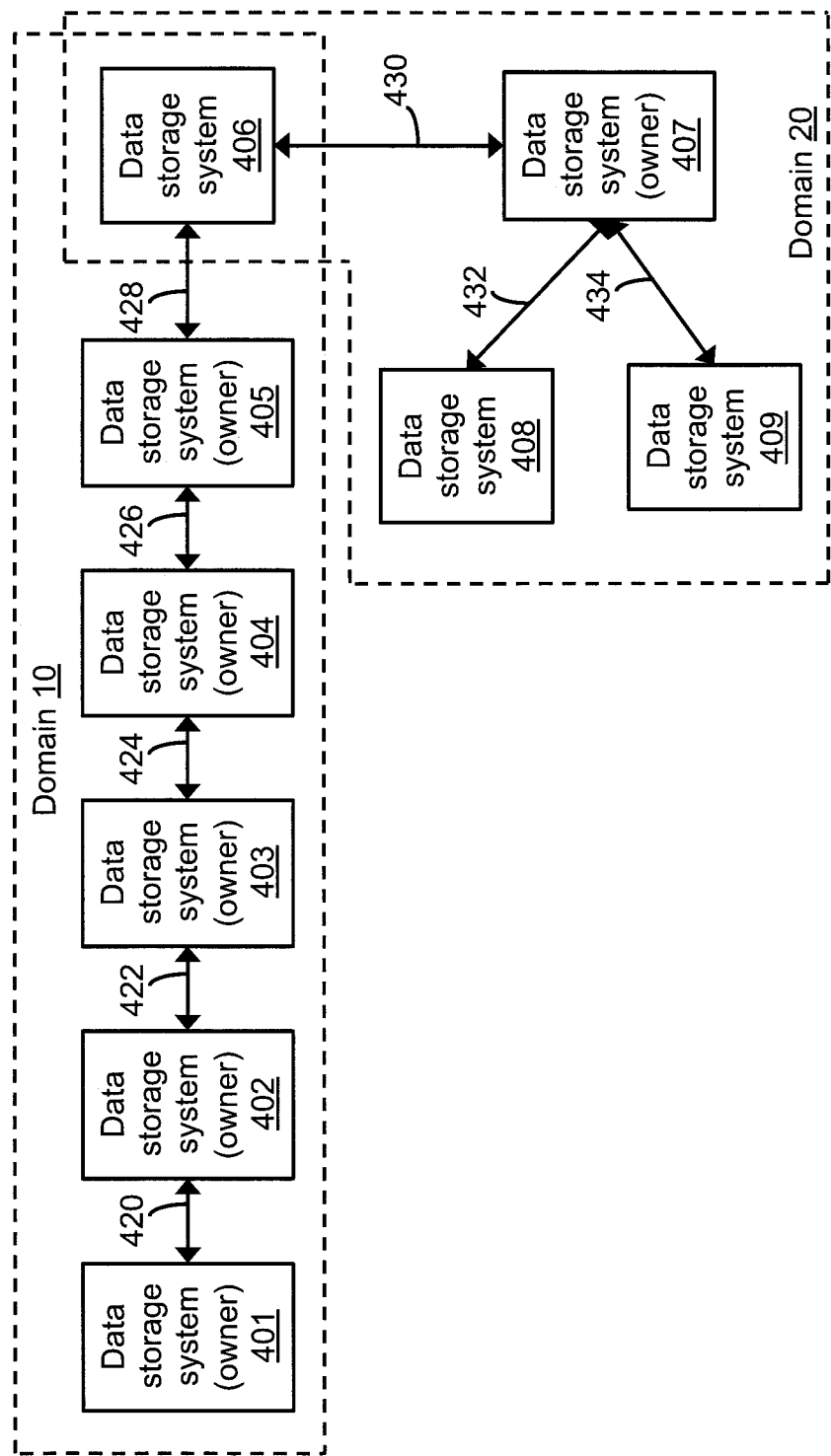
FIG. 4 is a block diagram of a serverless approach to the management of one or more storage system domains.

The disclosed systems, methods, and techniques, as well as many of their attendant advantages, will be further understood with reference to FIGS. 2-4. FIG. 2 depicts two exemplary groups 200*a*, 200*b* of interconnected peer storage systems. As shown in FIG. 2, the group 200*a* includes six (6) peer storage systems, namely, a peer storage system 201, a peer storage system 202, a peer storage system 203, a peer storage system 204, a peer storage system 205, and a peer storage system 206. The group 200a of peer storage systems 201-206 is configured such that any peer storage system within the group 200a can function as a data mobility target for any other peer storage system within the group 200a, resulting in the need for fifteen (15; i.e., N*(N−1)/2, where N=6) secure communications connections 220 to interconnect the six (6) peer storage systems 201-206. For example, the peer storage system 201 and the peer storage system 202 can be authenticated to one another through the exchange of local credentials (e.g., usernames, passwords or certificates) over a connection 221. Once authenticated, the connection 221 is established as a secure communications connection between the peer storage systems 201, 202, allowing the respective storage systems 201, 202 to communicate directly with one another over the secure connection 221.

As further shown in FIG. 2, the group 200b includes three (N=3) peer storage systems, namely, a peer storage system 207, a peer storage system 208, and a peer storage system 209. Like the group 200a of six (6) peer storage systems, the group 200b of three (3) peer storage systems is configured such that any peer storage system within the group 200b can function as a data mobility target for any other peer storage system within the group 200b, resulting in the need for three (3; i.e., N*(N−1)/2, where N=3) secure communications connections 222, 224, 226 to interconnect the three (3) peer storage systems 207-209. For example, the peer storage system 207 and the peer storage system 208 can be authenticated to one another through the exchange of local credentials (e.g., usernames, passwords or certificates) over the connection 222. Once authenticated, the connection 222 is established as a secure communications connection between the peer storage systems 207, 208, allowing the respective storage systems 207, 208 to communicate directly with one another over the secure connection 222.

The peer-to-peer approach to establishing secure communications connections among the group 200a of peer storage systems 201-206 and the group 200b of peer storage systems 207-209 can be problematic, however, especially as the numbers of peer storage systems in the respective groups 200a, 200b increase. For example, to assure high levels of security within the groups 200a, 200b of peer storage systems, the local credentials (e.g., usernames, passwords or certificates) used for authentication of the respective storage systems are typically renewed on a regular or periodic basis. However, having to renew the credentials associated with each secure communications connection that might be established within the groups 200a, 200b of peer storage systems can place a significant burden on a system administrator who may be called upon to manage the renewal of credentials associated with an increasing number of such secure connections.

FIG. 3 depicts two exemplary storage system domains 1, 2 managed by a domain management server 320. As shown in FIG. 3, each domain 1, 2 has a plurality of data storage systems as members. Specifically, domain 1 has, as members, six (6) data storage systems, namely, a data storage system 301, a data storage system 302, a data storage system 303, a data storage system 304, a data storage system 305, and a data storage system 306. Further, domain 2 has, as members, four (4) data storage systems, namely, the data storage system 306, a data storage system 307, a data storage system 308, and a data storage system 309. As illustrated in FIG. 3, the data storage system 306 is a member of, and therefore can participate in, each of domains 1 and 2. As further shown in FIG. 3, each of the data storage systems 301, 302, 303, 304, 305, 306, 307, 308, 309 can communicate domain credential information over nine (9) secure communications connections 321, 322, 323, 324, 325, 326, 327, 328, 329, respectively, with the domain management server 320. For example, the data storage system 301 can register with the domain management server 320 and become a member of (or a participant in) domain 1, and communicate over the secure connection 321 with the domain management server 320 to determine whether another data storage system (such as the data storage system 302) to which it desires to be authenticated is also a member of domain 1. If it is determined that the data storage system 302 is a member of domain 1, then the data storage system 301 can retrieve domain credentials (e.g., shared certificate) over the secure connection 321 from the data management server 320 for authentication with the data storage system 302. Once authenticated, a secure communications connection 340 is established between the respective storage systems 301, 302 within the domain 1, allowing the data storage systems 301, 302 to communicate data directly between one another over the secure connection 340.

The burden of managing the renewal of credentials can be reduced in the approach involving domain memberships, as the number of secure connections for communicating domain credentials can be reduced to that required for the respective storage systems to communicate with the domain management server. For example, with reference to the peer-to-peer approach of FIG. 2 and the approach of FIG. 3 involving domain memberships, the number of secure connections for communicating credentials is reduced from eighteen (15+3=18) in FIG. 2 to nine (9) in FIG. 3. However, the approach involving domain memberships can also be problematic in that it introduces a dependency upon the domain management server 320, which potentially adds a single point of failure or network latency. For example, if the domain management server 320 experiences a hardware fault and/or software error, crashes, goes offline, or otherwise becomes inoperative, then the ability to authenticate within a storage system environment may at least temporarily be lost until the domain management server 320 comes back online. To avoid such a situation, the domain management server 320 can be configured as a high availability server in a cluster environment. However, employing such a high availability domain management server can add an inordinate amount of complexity and/or cost within the storage system environment.

FIG. 4 depicts an illustrative embodiment of a serverless approach to the management of one or more storage system domains. Specifically, FIG. 4 depicts two exemplary storage system domains, namely, domain 10 and domain 20. As shown in FIG. 4, domains 10, 20 each have a plurality of data storage systems as members. Specifically, domain 10 has, as members, six (6) data storage systems, namely, a data storage system 401, a data storage system 402, a data storage system 403, a data storage system 404, a data storage system 405, and a data storage system 406. Further, domain 20 has, as members, four (4) data storage systems, namely, the data storage system 406, a data storage system 407, a data storage system 408, and a data storage system 409. As illustrated in FIG. 4, the data storage system 406 is a member of, and therefore can participate in, each of domains 10 and 20. It is noted that each of the data storage systems 401-406 within domain 10, as well as each of the data storage systems 407-409 within domain 20, can be communicably coupled as a node on the network 110 (see FIG. 1a) to enable it to communicate and exchange signaling with one or more of the host computers 102.1, 102.2, . . . , 102.n and/or the system administrator computer 106 within the storage system environment 100.

The disclosed serverless approach to the management of one or more storage system domains will be further understood with reference to the following illustrative example, as well as FIGS. 1a, 1c, and 4. In this example, a system administrator can employ the system administrator computer 106 (see FIG. 1a) to define the exemplary domains 10, 20 (see FIG. 4), as well as add members to (and remove members from) the respective domains 10, 20. To define domain 10, the system administrator using the system administrator computer 106 can log-into or otherwise establish secure communications with the data storage system 401 (see FIG. 4). Having logged-into the data storage system 401, the system administrator computer 106 can be used to provide the domain definition (e.g., domain name ("Domain 10"), shared certificate for domain 10) to the data storage system 401 for storage in its local memory 126 (see FIG. 1c), thereby establishing the data storage system 401 as a member of domain 10. In addition, the system administrator computer 106 can be used to designate the data storage system 401 as an "owner" of domain 10, providing it with privileges pertaining to (i) the addition of new members to the domain 10, (ii) the removal of members from the domain 10, and (iii) the modification of the credentials (e.g., shared certificate) for domain 10. It is noted that, in this illustrative example, only data storage systems designated as "owners" of a domain are provided with privileges pertaining to the addition of new domain members, the removal of domain members, and the modification of domain credentials. In this example, data storage systems without domain owner designations are not provided with such privileges.

While still logged-into the data storage system 401, the system administrator computer 106 can be used to authenticate the data storage system 401 and the data storage system 402 to one another through an exchange of local credentials. It is noted that the local credentials of the respective storage systems 401, 402 do not need to be persisted on the other data storage system once the data storage systems 401, 402 are authenticated to one another. Once authenticated, a trust relationship is established over a secure communications connection 420 between the respective storage systems 401, 402, and the domain definition (e.g., domain name ("Domain 10"), shared certificate for domain 10), as well as membership information (e.g., a member identifier for the data storage system 401) for domain 10, are copied, pushed, or otherwise provided from the data storage system 401 to the data storage system 402 over the secure connection 420 for storage in the local memory 126 of the data storage system 402. Once the definition and membership information for domain 10 are provided to the data storage system 402, the data storage system 402 is established as another member of domain 10, a member identifier for the data storage system 402 is added to the membership information for domain 10, and the updated membership information for domain 10 is shared with the data storage system 401, using the domain credentials. In addition, the system administrator computer 106 can (optionally) be used to designate the data storage system 402 as another "owner" (or co-owner) of domain 10, providing it with privileges pertaining to (i) the addition of new members to the domain 10, (ii) the removal of members from the domain 10, and (iii) the modification of the credentials (e.g., shared certificate) for domain 10.

Because the data storage system 402 is a co-owner of domain 10, the system administrator using the system administrator computer 106 can log-into or otherwise establish secure communications with the data storage system 402 to add one or more additional members to domain 10. Having logged-into the data storage system 402, the system administrator computer 106 can be used to authenticate the data storage system 402 and the data storage system 403 to one another through an exchange of local credentials. Once authenticated, a trust relationship is established over a secure communications connection 422 between the respective storage systems 402, 403, and the domain definition (e.g., domain name ("Domain 10"), shared certificate for domain 10), as well as the membership information (e.g., member identifiers for the data storage systems 401, 402) for domain 10, are copied, pushed, or otherwise provided from the data storage system 402 to the data storage system 403 over the secure connection 422 for storage in the local memory 126 of the data storage system 403. Once the definition and membership information for domain 10 are provided to the data storage system 403, the data storage system 403 is established as still another member of domain 10, a member identifier for the data storage system 403 is added to the membership information for domain 10, and the updated membership information for domain 10 is shared among the data storage systems 401-403, using the domain credentials. In addition, the system administrator computer 106 can (optionally) be used to designate the data storage system 403 as still another "owner" (or co-owner) of domain 10, providing it with privileges pertaining to (i) the addition of new members to the domain 10, (ii) the removal of members from the domain 10, and (iii) the modification of the credentials (e.g., shared certificate) for domain 10.

The system administrator using the system administrator computer 106 can similarly log-into or otherwise establish secure communications with the data storage system 403 (i) to establish a trust relationship over a secure communications connection 424 between the data storage system 403 and the data storage system 404, (ii) to establish the data storage system 404 as a fourth member of domain 10, and (iii) to (optionally) designate the data storage system 404 as a fourth "owner" (or co-owner) of domain 10. Further, the system administrator can log-into or otherwise establish secure communications with the data storage system 404 (i) to establish a trust relationship over a secure communications connection 426 between the data storage system 404 and the data storage system 405, (ii) to establish the data storage system 405 as a fifth member of domain 10, and (iii) to (optionally) designate the data storage system 405 as a fifth "owner" (or co-owner) of domain 10. In addition, the system administrator can log-into or otherwise establish secure communications with the data storage system 405 (i) to establish a trust relationship over a secure communications connection 428 between the data storage system 405 and the data storage system 406, and (ii) to establish the data storage system 406 as a sixth member of domain 10. It is noted that the system administrator can option not to designate the data storage system 406 as an owner (or co-owner) of domain 10. Having added the data storage systems 401-406 as members of domain 10, the domain definition (e.g., domain name ("Domain 10"), shared certificate for domain 10) and the updated membership information (e.g., member identifiers for the data storage systems 401-406) for domain 10 are ultimately distributed and/or shared among the respective storage systems 401-406 for storage in their local memories 126.

Having defined domain 10, the system administrator using the system administrator computer 106 can log-into or otherwise establish secure communications with any of the data storage systems 401-405 designated as an owner of domain 10, and remove one or more members from domain 10 and/or modify the credentials (e.g., shared certificate) of domain 10. For example, the system administrator computer 106 can be used to log-into the data storage system 402 (which is an owner of domain 10) and remove the data storage system 401 from domain 10 by deleting its member identifier from the membership information for domain 10. The system administrator computer 106 can also be used to modify the credentials (e.g., shared certificate) of domain 10 at the data storage system 402. Having deleted the member identifier for the data storage system 401 from the membership information for domain 10, as well as modified the credentials (e.g., shared certificate) of domain 10, the modified credentials and updated membership information are automatically propagated, over the secure connections 422, 424, 426, 428, from the data storage system 402 to each of the remaining member storage systems 403-406 of domain 10.

To define domain 20, the system administrator using the system administrator computer 106 can log-into or otherwise establish secure communications with the data storage system 407 (see FIG. 4). Having logged-into the data storage system 407, the system administrator computer 106 can provide the domain definition (e.g., domain name ("Domain 20"), shared certificate for domain 20) to the data storage system 407 for storage in its local memory 126 (see FIG. 1c), thereby establishing the data storage system 407 as a member of domain 20. In addition, the system administrator computer 106 can designate the data storage system 407 as an "owner" of domain 20, providing it with privileges pertaining to (i) the addition of new members to the domain 20, (ii) the removal of members from the domain 20, and (iii) the modification of the credentials (e.g., shared certificate) for domain 20.

While still logged-into the data storage system 407, the system administrator computer 106 can be used to authenticate the data storage system 407 and the data storage system 406 to one another through an exchange of local credentials. It is noted that the local credentials of the data storage systems 406, 407 do not need to be persisted on the other data storage system once the respective storage systems 406, 407 are authenticated to one another. Once authenticated, a trust relationship is established over a secure communications connection 430 between the respective storage systems 406, 407, and the domain definition (e.g., domain name ("Domain 20"), shared certificate for domain 20), as well as membership information (e.g., a member identifier for the data storage system 407) for domain 20, are copied, pushed, or otherwise provided from the data storage system 407 to the data storage system 406 over the secure connection 430 for storage in the local memory 126 of the data storage system 406. Once the definition and membership information for domain 20 are provided to the data storage system 406, the data storage system 406 is established as another member of domain 20, a member identifier for the data storage system 406 is added to the membership information for domain 20, and the updated domain membership information is shared among the data storage systems 406, 407, using the domain credentials. It is noted that, in this example, the data storage system 406 is a member of both domain 10 and domain 20, and therefore stores the unique definitions of domain 10 and domain 20, as well as the membership information for both domain 10 and domain 20, in its local memory 126.

While still logged-into the data storage system 407, the system administrator computer 106 can be used to authenticate the data storage system 407 and the data storage system 408 to one another through an exchange of local credentials. Once authenticated, a trust relationship is established over a secure communications connection 432 between the respective storage systems 407, 408, and the domain definition (e.g., domain name ("Domain 20"), shared certificate for domain 20), as well as the membership information (e.g., member identifiers for the data storage systems 406, 407) for domain 20, are copied, pushed, or otherwise provided from the data storage system 407 to the data storage system 408 over the secure connection 432 for storage in the local memory 126 of the data storage system 408. Once the definition and membership information for domain 20 are provided to the data storage system 408, the data storage system 408 is established as still another member of domain 20, a member identifier for the data storage system 408 is added to the membership information for domain 20, and the updated membership information for domain 20 is shared among the data storage systems 406, 407, 408, using the domain credentials.

Likewise, the system administrator computer 106 can be used to authenticate the data storage system 407 and the data storage system 409 to one another through an exchange of local credentials. Once authenticated, a trust relationship is established over a secure communications connection 434 between the respective storage systems 407, 409, and the domain definition (e.g., domain name ("Domain 20"), shared certificate for domain 20), as well as the membership information (e.g., member identifiers for the data storage systems 406-408) for domain 20, are copied, pushed, or otherwise provided from the data storage system 407 to the data storage system 409 over the secure connection 434 for storage in the local memory 126 of the data storage system 409. Once the definition and membership information for domain 20 are provided to the data storage system 409, the data storage system 409 is established as yet another member of domain 20, a member identifier for the data storage system 409 is added to the membership information for domain 20, and the updated membership information for domain 20 is shared among the data storage systems 406-409, using the domain credentials. It is noted that, in this example, only the data storage system 407 is designated as an "owner" of domain 20. Having added the data storage systems 406-409 as members of domain 20, the domain definition (e.g., domain name ("Domain 20"), shared certificate for domain 20) and the updated membership information (e.g., member identifiers for the data storage systems 406-409) for domain 20 are stored in each local memory 126 of the respective storage systems 406-409.

Having defined domain 20, the system administrator using the system administrator computer 106 can log-into or otherwise establish secure communications with any of the data storage systems 406-409 designated as an owner of domain 20, and remove one or more members from domain 20 and/or modify the credentials (e.g., shared certificate) of domain 20. For example, the system administrator computer 106 can be used to log-into the data storage system 407 (which is an owner of domain 20) and remove the data storage system 409 from domain 20 by deleting its member identifier from the membership information for domain 20. The system administrator computer 106 can also be used to modify the credentials (e.g., shared certificate) of domain 20 at the data storage system 407. Having deleted the member identifier for the data storage system 409 from the membership information for domain 20, as well as modified the credentials (e.g., shared certificate) of domain 20, the modified domain credentials and updated membership information are automatically propagated, over the secure connections 430, 432, 434, from the data storage system 407 to each of the remaining member storage systems 406, 408, 409 of domain 20.

Figure 5:
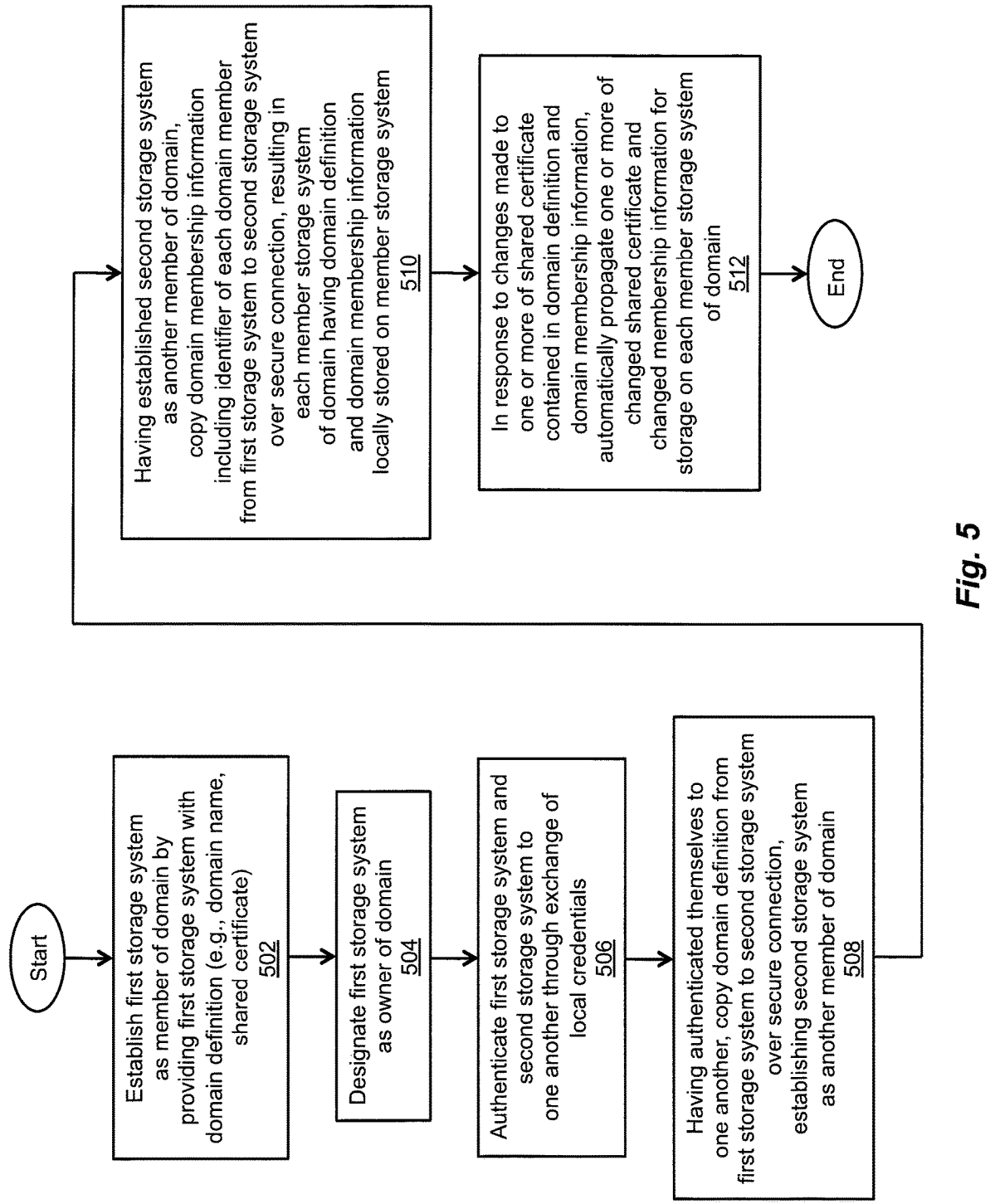
FIG. 5 is a flow diagram of an exemplary method of serverless management of data mobility domains.

An exemplary method of serverless management of data mobility domains is described herein with reference to FIG. 5. As depicted in block 502 (see FIG. 5), a first storage system is established as a member of a domain by providing the first storage system with a definition (e.g., domain name, shared certificate) of the domain. As depicted in block 504, the first storage system is designated as an owner of the domain. As depicted in block 506, the first storage system and a second storage system authenticate themselves to one another through an exchange of local credentials. As depicted in block 508, having authenticated themselves to one another, the domain definition is copied from the first storage system to the second storage system over a secure connection, establishing the second storage system as another member of the domain. As depicted in block 510, having established the second storage system as another member of the domain, domain membership information including an identifier of each domain member is copied from the first storage system to the second storage system over the secure connection, resulting in each member storage system of the domain having the domain definition and the domain membership information locally stored on the member storage system. As depicted in block 512, in response to changes made to one or more of the shared certificate contained in the domain definition and the domain membership information (e.g., resulting from the addition and/or removal of a storage node to/from the domain), one or more of the changed shared certificate and the changed membership information are automatically propagated for storage on each member storage system of the domain.

Having described the above illustrative embodiments of the disclosed systems, methods, and techniques, other alternative embodiments, modifications, and/or variations may be made. For example, it was described herein that a system administrator computer could be used to designate any data storage system that is a member of a domain as an owner of the domain, providing it with privileges pertaining to (i) the addition of new members to the domain, (ii) the removal of members from the domain, and (iii) the modification of the credentials (e.g., shared certificate) of the domain. In certain embodiments, the system administrator computer can be used to directly remove any data storage system from a domain, whether or not the data storage system is an owner of the domain. For example, with regard to domain 10, the system administrator computer 106 can be used to log-into or otherwise establish secure communications with either the data storage system 401 (which is an owner of domain 10) or the data storage system 406 (which is not an owner of domain 10), and remove the respective storage system 401 or 406 from domain 10. Before the removal of the respective storage system 401 or 406 from domain 10 is completed, updated membership information for domain 10 (with the member identifier for the data storage system 401 or 406 deleted) is automatically propagated from the data storage system 401 or 406 to be removed to the remaining storage systems within domain 10.

Further, with regard to domain 20, the system administrator computer 106 can be used to log-into or otherwise establish secure communications with the data storage system 407 (which is the sole owner of domain 20) to remove the data storage system 407 from domain 20. However, before removing the data storage system 407 from domain 20, the system administrator computer 106 is first used to designate at least one of the remaining storage systems 406, 408, 409 as an "owner" (or co-owner) of domain 20 to assure that once the data storage system 407 is removed from domain 20, at least one other owner (or co-owner) of domain 20 remains. Having designated one of the data storage systems 406, 408, 409 as an "owner" (or co-owner) of domain 20, updated membership information for domain 20 (with the member identifier for the data storage system 407 deleted) can be automatically propagated from the data storage system 407 to the data storage systems 406, 408, 409, and the data storage system 407 can then be removed from domain 20. It is noted that, once the data storage system 407 is removed from domain 20, one or more secure communications connections can be established at the remaining owner of domain 20 to interconnect the data storage systems 406, 408, 409 within domain 20, using the methods and techniques described herein.

It was further described herein that domain data replication and/or migration among two or more members of a data storage domain could be performed in a push (or pull) fashion. In certain embodiments, data can be synchronously replicated and/or migrated among the members (nodes) of a data storage domain by sending messages in the form of synchronous notifications, implementing broadcast (e.g., user datagram protocol (UDP)) or multicast events, and/or any other suitable method or technique.

While various embodiments of the invention have been particularly shown and described, it will be understood by those skilled in the art that various changes in form and details may be made therein without departing from the scope of the invention as defined by the appended claims.

What is claimed is:

1. A method of serverless management of data mobility domains in a network, comprising:

receiving a domain definition of a data mobility domain at a first storage system in the network to establish the first storage system as a first member among a plurality of members of the data mobility domain, the domain definition including a domain name and domain credentials;

establishing a first secure connection between the first storage system and a second storage system in the network, the establishing of the first secure connection including authenticating the first storage system and the second storage system to one another through an exchange of local credentials, the first storage system being designated as an owner of the data mobility domain, the first storage system storing domain membership information including member identifiers identifying all of the plurality of members as respective members of the data mobility domain;

having authenticated the first storage system and the second storage system to one another, copying, over the first secure connection, the domain definition from the first storage system to the second storage system to establish the second storage system as a second member among the plurality of members of the data mobility domain;

updating the domain membership information to include a respective member identifier identifying the second storage system as the second member of the data mobility domain;

automatically propagating, using the domain credentials, the updated domain membership information from the first storage system designated as the owner of the data mobility domain to the plurality of members of the data mobility domain including the second storage system, the automatically propagating of the updated domain membership information including authenticating the first storage system and the second storage system to one another through an exchange of the domain credentials included in the domain definition;

having automatically propagated the updated domain membership information to the second storage system and authenticated the first storage system and the second storage system to one another, designating the second storage system as a co-owner of the data mobility domain, each of the first storage system designated as the owner and the second storage system designated as the co-owner having management privileges pertaining to (i) adding one or more new members to the data mobility domain, (ii) removing one or more existing members from the data mobility domain, and (iii) modifying the domain credentials; and having designated the first storage system and the second storage system as the owner and the co-owner, respectively, of the data mobility domain, reducing activities of a system administrator pertaining to at least one of adding the one or more new members, removing the one or more existing members, and modifying the domain credentials.

2. The method of claim 1 further comprising:
establishing a second secure connection between the second storage system and a third storage system in the network, the establishing of the second secure connection including authenticating the second storage system and the third storage system to one another.

3. The method of claim 2 further comprising:
having authenticated the second storage system and the third storage system to one another, copying, over the second secure connection, the domain definition from the second storage system to the third storage system to establish the third storage system as a third member among the plurality of members of the data mobility domain.

4. The method of claim 3 further comprising:
updating the domain membership information to reflect establishment of the third storage system as the third member among the plurality of members of the data mobility domain, the updating of the domain membership information to reflect establishment of the third storage system as the third member including causing a change in the domain membership information.

5. The method of claim 4 further comprising:
in response to the change in the domain membership information caused by the establishment of the third storage system as the third member of the data mobility domain, automatically propagating the change over the network to the plurality of members of the data mobility domain using the domain credentials.

6. The method of claim 3 further comprising:
removing the third storage system from the data mobility domain by deleting, at one of the first storage system and the second storage system, information pertaining to the third member of the data mobility domain from the domain membership information.

7. The method of claim 6 further comprising:
updating the domain membership information to reflect removal of the third storage system from the data mobility domain, the updating of the domain membership information to reflect removal of the third storage system including causing a change in the domain membership information.

8. The method of claim 7 further comprising:
in response to the change in the domain membership information caused by the removal of the third storage system from the data mobility domain, automatically propagating the change over the network to remaining ones of the plurality of members of the data mobility domain using the domain credentials.

9. The method of claim 1 further comprising:
modifying the domain credentials at the first storage system, the modifying of the domain credentials at the first storage system including causing a change in the domain credentials.

10. The method of claim 9 further comprising:
in response to the change in the domain credentials caused by the modifying of the domain credentials at the first storage system, automatically propagating the change over the network from the first storage system to the plurality of members of the data mobility domain using the domain credentials.

11. The method of claim 1 further comprising:
performing, by the first storage system designated as the owner of the data mobility domain, one or more of (i) the adding of one or more new members to the data mobility domain, (ii) the removing of one or more existing members from the data mobility domain, and (iii) the modifying of the domain credentials.

12. The method of claim 11 further comprising:
performing, by the second storage system designated as the co-owner of the data mobility domain, one or more of (i) the adding of one or more new members to the data mobility domain, (ii) the removing of one or more existing members from the data mobility domain, and (iii) the modifying of the domain credentials.

13. The method of claim 1 further comprising:
modifying the domain credentials; and
automatically propagating the modified domain credentials from the first storage system to the plurality of members of the data mobility domain.

14. A system for serverless management of data mobility domains over a network, comprising:
a plurality of data storage systems including at least a first storage system comprising a first memory and a second storage system comprising a second memory, each of the plurality of data storage systems being coupled to the network, wherein the first storage system is operative:
to receive a domain definition of a data mobility domain to establish the first storage system as a first member among a plurality of members of the data mobility domain, the domain definition including a domain name and domain credentials;
to establish a first secure connection between the first storage system and the second storage system, establishing the first secure connection including authenticating the first storage system to the second storage system through an exchange of local credentials, the first storage system being designated as an owner of the data mobility domain;
to store domain membership information including member identifiers identifying all of the plurality of members as respective members of the data mobility domain;
having authenticated the first storage system to the second storage system, to copy, over the first secure connection, the domain definition to the second storage system to establish the second storage system as a second member among the plurality of members of the data mobility domain;

to update the domain membership information to include a respective member identifier identifying the second storage system as the second member of the data mobility domain;

to automatically propagate, using the domain credentials, the updated domain membership information from the first storage system designated as the owner of the data mobility domain to the plurality of members of the data mobility domain including the second storage system, automatically propagating the updated domain membership information including authenticating the first storage system to the second storage system through an exchange of the domain credentials included in the domain definition;

having automatically propagated the updated domain membership information to the second storage system and authenticated the first storage system and the second storage system to one another, to designate the second storage system as a co-owner of the data mobility domain, each of the first storage system designated as the owner and the second storage system designated as the co-owner having management privileges pertaining to (i) adding one or more new members to the data mobility domain, (ii) removing one or more existing members from the data mobility domain, and (iii) modifying the domain credentials; and having designated the first storage system and the second storage system as the owner and the co-owner, respectively, of the data mobility domain, reducing activities of a system administrator pertaining to at least one of adding the one or more new members, removing the one or more existing members, and modifying the domain credentials.

15. The system of claim 14 wherein the plurality of data storage systems further include a third storage system, and wherein the second storage system is operative to establish a second secure connection between the second storage system and the third storage system, establishing the second secure connection including authenticating the second storage system to the third storage system.

16. The system of claim 15 wherein the second storage system is further operative, having authenticated the second storage system to the third storage system, to copy, over the second secure connection, the domain definition to the third storage system to establish the third storage system as a third member among the plurality of members of the data mobility domain.

17. The system of claim 16 wherein the second storage system is further operative to update the domain membership information to reflect establishment of the third storage system as the third member among the plurality of members of the data mobility domain, wherein the updating of the domain membership information to reflect establishment of the third storage system as the third member includes causing a change in the domain membership information.

18. The system of claim 17 wherein the second storage system is further operative, in response to the change in the domain membership information caused by the establishment of the third storage system as the third member of the data mobility domain, to automatically propagate the change over the network to the plurality of members of the data mobility domain using the domain credentials.

19. The system of claim 14 wherein the plurality of data storage systems are configured and arranged in the network as a plurality of cloud-based elastic storage systems.

20. A computer program product having a non-transitory computer readable medium that stores a set of instructions that, when carried out by computerized circuitry, cause the computerized circuitry to perform a method of serverless management of data mobility domains in a network, the method comprising:

receiving a domain definition of a data mobility domain at a first storage system in the network to establish the first storage system as a first member among a plurality of members of the data mobility domain, the domain definition including a domain name and domain credentials;

establishing a first secure connection between the first storage system and a second storage system in the network, the establishing of the first secure connection including authenticating the first storage system and the second storage system to one another through an exchange of local credentials, the first storage system being designated as an owner of the data mobility domain, the first storage system storing domain membership information including member identifiers identifying all of the plurality of members as respective members of the data mobility domain;

having authenticated the first storage system and the second storage system to one another, copying, over the first secure connection, the domain definition from the first storage system to the second storage system to establish the second storage system as a second member among the plurality of members of the data mobility domain;

updating the domain membership information to include a respective member identifier identifying the second storage system as the second member of the data mobility domain;

automatically propagating, using the domain credentials, the updated domain membership information from the first storage system designated as the owner of the data mobility domain to the plurality of members of the data mobility domain including the second storage system, the automatically propagating of the updated domain membership information including authenticating the first storage system and the second storage system to one another through an exchange of the domain credentials included in the domain definition;

having automatically propagated the updated domain membership information to the second storage system and authenticated the first storage system and the second storage system to one another, designating the second storage system as a co-owner of the data mobility domain, each of the first storage system designated as the owner and the second storage system designated as the co-owner having management privileges pertaining to (i) adding one or more new members to the data mobility domain, (ii) removing one or more existing members from the data mobility domain, and (iii) modifying the domain credentials; and having designated the first storage system and the second storage system as the owner and the co-owner, respectively, of the data mobility domain, reducing activities of a system administrator pertaining to at least one of adding the one or more new members, removing the one or more existing members, and modifying the domain credentials.

21. The method of claim 20 further comprising:
establishing a second secure connection between the second storage system and a third storage system in the network, the establishing of the second secure connection including authenticating the second storage system and the third storage system to one another;
having authenticated the second storage system and the third storage system to one another, copying, over the second secure connection, the domain definition from the second storage system to the third storage system to establish the third storage system as a third member among the plurality of members of the data mobility domain;
updating the domain membership information to reflect establishment of the third storage system as the third member among the plurality of members of the data mobility domain, the updating of the domain membership information to reflect establishment of the third storage system as the third member including causing a change in the domain membership information; and
in response to the change in the domain membership information caused by the establishment of the third storage system as the third member of the data mobility domain, automatically propagating the change over the network to the plurality of members of the data mobility domain using the domain credentials.

\* \* \* \* \*